United States Patent [19]
Salzer et al.

[11] 3,794,236
[45] Feb. 26, 1974

[54] MONITORING AND CONTROL MEANS FOR EVALUATING THE PERFORMANCE OF VIBRATORY-TYPE DEVICES

[75] Inventors: Thomas Salzer, Bedford; Charles T. Martin, Jr., Lexington, both of Mass.

[73] Assignee: Raytheon Company, Lexington, Mass.

[22] Filed: May 7, 1973

[21] Appl. No.: 358,215

Related U.S. Application Data

[63] Continuation of Ser. No. 168,231, Aug. 2, 1971, abandoned.

[52] U.S. Cl. ............... 228/1, 29/470.1, 73/67.2, 73/70.2, 228/8
[51] Int. Cl. ............................................. B23k 5/20
[58] Field of Search ........... 73/67, 67.2, 71.2, 71.4; 228/1, 8, 9; 29/470.1; 329/56

[56]  References Cited
UNITED STATES PATENTS

| | | | |
|---|---|---|---|
| 2,433,963 | 1/1948 | Tarbox et al. | 219/4 |
| 2,946,119 | 7/1960 | Jones et al. | 29/470 |
| 3,153,850 | 10/1964 | Walton et al. | 29/470 |
| 3,212,695 | 10/1965 | MacGregor | 228/1 |
| 3,302,277 | 2/1967 | Pruden et al. | 29/407 |

Primary Examiner—J. Spencer Overholser
Assistant Examiner—Robert J. Craig
Attorney, Agent, or Firm—Harold A. Murphy; Joseph D. Pannone; John T. Meaney

[57] ABSTRACT

Apparatus and method for determining the operative effectiveness of a vibrating means coupled to a non-linear load, said apparatus comprising a vibrating means operatively connected to a source of vibratory energy and having coupling means for connecting to a non-linear load, vibration sensing means electrically connected to a harmonic analyzing means having an output electrically connected to an indicator means which may include a display means and a control means.

7 Claims, 6 Drawing Figures

PATENTED FEB 26 1974 3,794,236
SHEET 2 OF 2
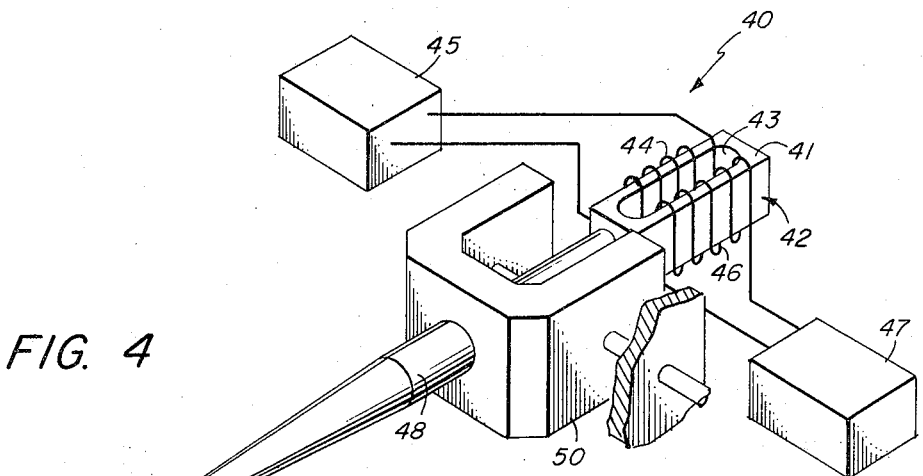
FIG. 4
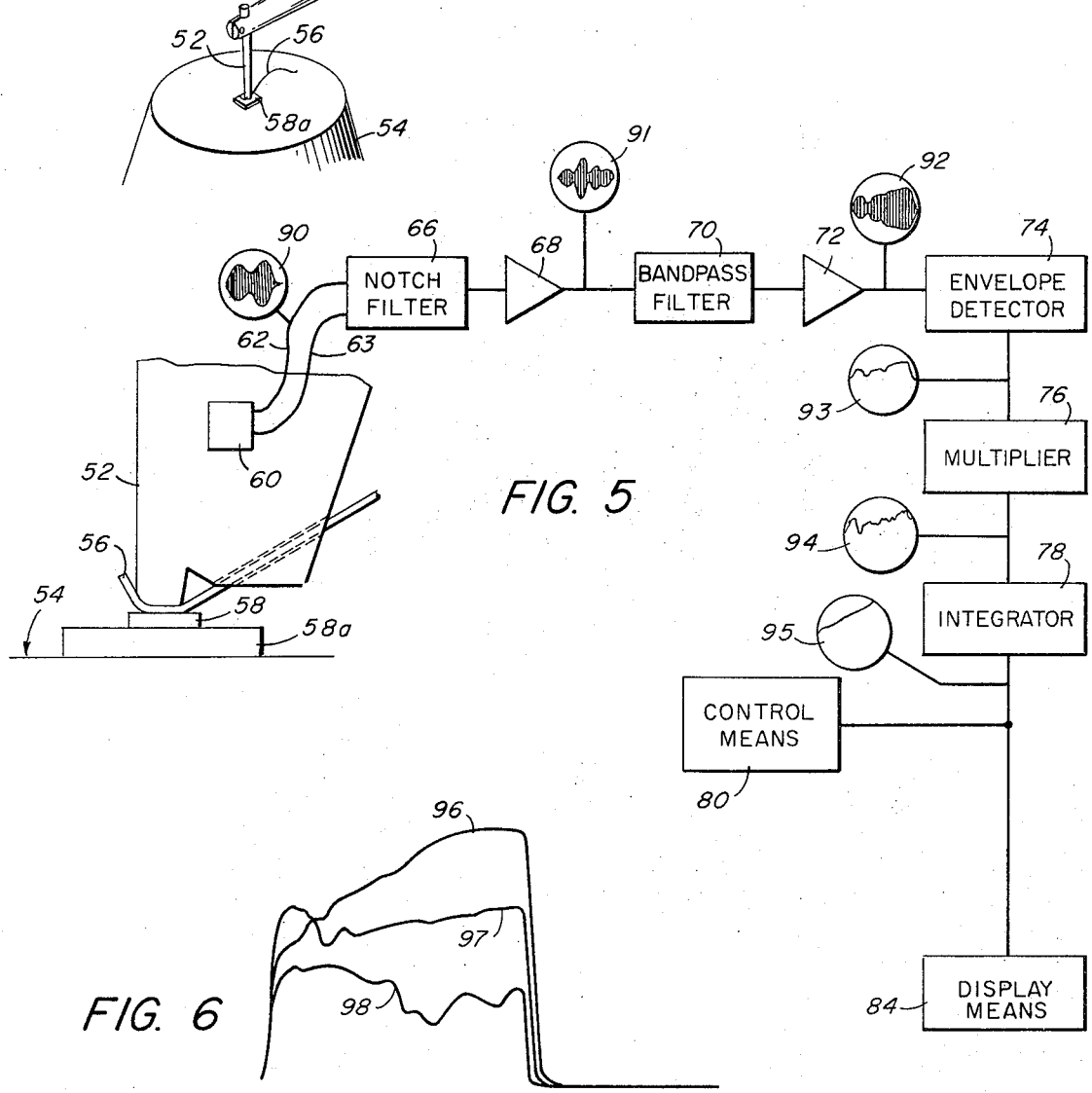
FIG. 5
FIG. 6

MONITORING AND CONTROL MEANS FOR EVALUATING THE PERFORMANCE OF VIBRATORY-TYPE DEVICES

This is a continuation of application Ser. No. 168,231 filed Aug. 2, 1971 now abandoned.

BACKGROUND OF THE INVENTION

The invention herein described was made in the course of and under a contract, or subcontract thereunder, with the Department of Defense.

This invention relates generally to a means for evaluating the performance of vibratory devices and is concerned more particularly with apparatus and method for determining the operative effectiveness of a vibrating means when coupled to a non-linear load.

Ultrasonic bonding is a process for joining two members by means of a bonding tool which exerts a clamping force on interfacing surface areas of the two members while vibrating at ultrasonic frequency. As a result, local plastic deformation takes place in the interfacing materials whereby a metallurigical bond is formed between the two members. Since this process does not require application of external heat or melting of the interfacing materials, ultrasonic bonding is a preferred process, in the semiconductor industry, for welding fine wire leads to metalized surface areas of semiconductor material.

Variations may occur in the bonding process as a result of changes in the level of ultrasonic energy applied to the bond areas, the clamping force exerted on the interfacing surfaces, the surface condition or material of the two members being joined, the time interval during which energy is applied and other factors which may affect the quality of the bonds produced. As a result, the interfacing surfaces of the welded members may be improperly joined due to overbonding, underbonding, and the like. Some of these defects, such as underbonding, for example, may be latent and, therefore, difficult to evaluate by means of conventional quality control techniques, such as visual inspection and bond strength tests, for example. Visual inspection has proven unsatisfactory due to a lack of correlation between the results of visual inspection and data subsequently obtained from bond strength tests. On the other hand, bond strength tests are not entirely satisfactory, because they usually are destructive and, therefore, can be applied on a sampling basis only. Since these screening techniques have proven inadequate, other means must be found for evaluating the quality of bonds formed by vibratory type devices.

The prior art discloses various methods and apparatus for evaluating bonds made by ultrasonic bonding machines. Generally, these prior art methods are based on changes occurring, during bonding, in the peak amplitude or in the phase of the fundamental vibration frequency, which usually is the resonant frequency of the bonding apparatus. However, it has been found that these changes may be relatively low in magnitude and, therefore, do not provide a sensitive indication of changes in bond quality. Also, these prior art methods do not take into consideration that, during the bonding operation, a vibrating means is coupled to a non-linear load, namely the plastically deforming materials in and adjacent the bond interface. Thus, in the evaluation of welds produced by ultrasonic bonding techniques, it would be advantageous to have a sensitive means for monitoring the operative effectiveness of the vibrating bonding tool on the non-linear load.

SUMMARY OF THE INVENTION

Accordingly, the present invention provides an apparatus and a method comprising, in combination, a source of oscillatory energy operatively connected to a vibrating means including a vibration generating means and a coupling means for connecting the vibrating means to a non-linear load such as the materials in and adjacent a bond interface, for example. This invention also includes a vibration sensing means responsive to the vibrational modes of the vibrating means and having corresponding electrical output which is connected to a harmonic analyzing means. The output of the analyzing means is connected to an indicator means which may include a control means and a display means.

When the vibrating means is not connected to a load or is connected to a linear load, its vibrational motion is substantially linear, since the restoring forces are proportional to the displacement. Consequently, the corresponding signal produced by the vibration sensing means is a purely sinusoidal representation of the fundamental drive frequency. However, when the vibrating means is connected to a non-linear load, it has been found that the vibrating means undergoes, in addition to its forced mode of vibration, other steady-state modes of vibration which are harmonically related to the excitation frequency. As a result, the corresponding electrical signals produced by the vibration sensing means comprises a superposition of the fundamental frequency and harmonics thereof which may be odd integral multiplies of the fundamental frequency. We have found that by isolating the components associated with a particular harmonic, such as the third harmonic, for example, and analyzing the changes taking place therein during bonding, an accurate evaluation can be made of the operative effectiveness of the vibrating means on the non-linear load.

A specific embodiment of this invention comprises an alternating current source energizing an electromechanical transducer which is fixedly attached to one end of an acoustical horn having a bonding tool depending from the opposing end thereof. Secured to the bonding tool is an accelerometer which senses the vibrations of the bonding tool and produces a corresponding electrical signal. The signal is conducted to a harmonic analyzing means wherein the components of a particular harmonic frequency are isolated, by means of suitable electronic filtering, and then demodulated to produce an associated envelope waveform. The resulting envelope waveform is then electronically multiplied and integrated to obtain a waveform indicative of the quality of an ultrasonic bond being formed. This final waveform is then conducted to a control means, such as a servo control unit, for example, and to a display means, such as an oscilloscope, for example.

BRIEF DESCRIPTION OF THE DRAWINGS

For a better understanding of this invention, reference is made to the accompanying drawing wherein:

FIG. 4 is a schematic representation of an ultrasonic bonding machine which may be used to practice this invention;

FIG. 5 is a block diagram of a typical electronic system which may be used to practice this invention; and FIG. 6 is a diagrammatic view of oscilloscope traces which may be obtained when practicing this invention.

DESCRIPTION OF THE PREFERRED EMBODIMENT

Figure 1:
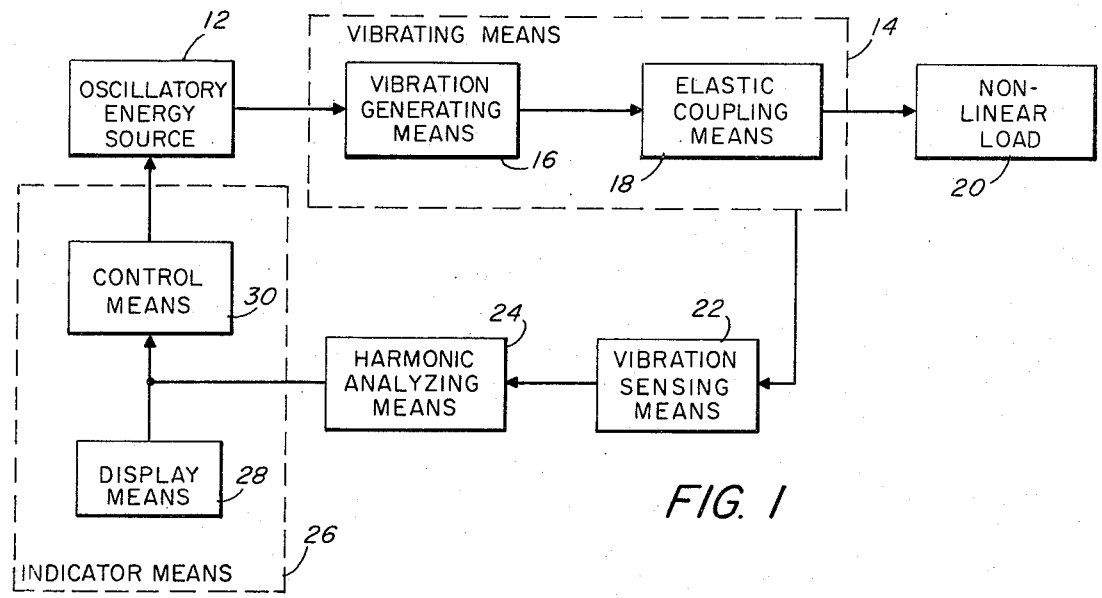
FIG. 1 is a block diagram showing the basic components of a system embodying this invention.

Referring to the drawing wherein like characters of reference designate like parts throughout the several views, there is shown in FIG. 1 the basic components of a sysetm 10 which embodies the apparatus of this invention and illustrates the method of utilizing it. System 10 comprises a source 12 of oscillatory energy operatively connected to a vibrating means 14 including a vibration generating means 16 which is attached to an elastic coupling means 18 for connecting the vibrating means 14 to a nonlinear load 20. Operatively secured to the vibrating means 14 is a vibration sensing means 22 which is electrically connected to a harmonic analyzing means 24. The output of the analyzing means 24 is electrically connected to an indicator means 26 which may include a display means 28 and a control means 30, for examples. The control means 30 may be operatively connected to a power source 12 for the purpose of regulating the oscilatory energy supplied to the vibrating means 14, adjusting the bonding time interval, or the like.

Figure 2:
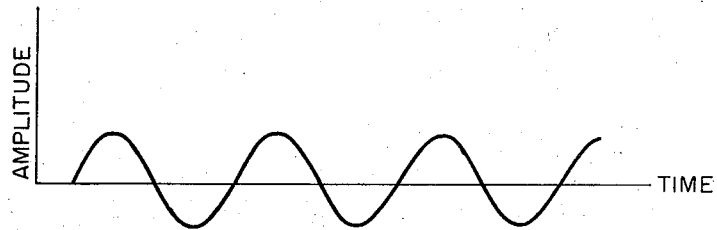
FIG. 2 is a diagrammatic view of an oscilloscope trace showing the vibrational motion of a vibrating means connected to a linear load or in the unloaded condition.

In operation the power source 12 activates the vibrating means 14 by supplying oscillatory energy to the vibration generating means 16. As a result, the generating means 16 vibrates the coupling means 18 at a predetermined frequency which, generally, is the mechanical resonant frequency of the vibrating means. The vibrational motion of vibrating means 14 is detected by the vibration sensing means 20 into a corresponding electrical signal which is conducted to the input of harmonic analyzing means 24. When the coupling means 18 is not connected to a load or is connected to a linear load, where the restoring forces are proportional to the displacement, the vibrational motion of the vibrating means obeys the laws of simple harmonic motion. Since the response of the vibration sensing means is substantially linear, it will produce electrical signals which correspond to the excitation frequency of the vibration generating means 16, as shown graphically in FIG. 2.

Figure 3:
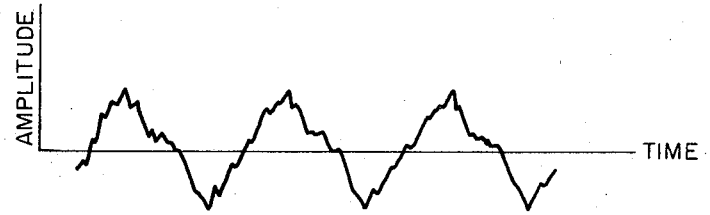
FIG. 3 is a diagrammatic view of an oscilloscope trace showing the vibrational motion of a vibrating means connected to a non-linear load.

However, when the coupling means 18 is connected to a non-linear load, such as the plastically deforming material of an ultrasonic bond, for example, the vibrating means 14 undergoes other modes of vibration which are superimposed on the mode associated with the excitation frequency. As shown in FIG. 3, the corresponding electrical signal produced by the vibration sensing means 22 is a complex waveform at the excitation frequency. It has been found that when the coupling means 18 is connected to a nonlinear load, the resulting motion of the vibrating means 14 is a superposition of the fundamental mode and odd harmonic modes; and these harmonic modes have characteristics which are indicative of the operative effectiveness of the vibrating means 14 on the nonlinear load 20. By providing suitable electronic filtering in the harmonic analyzing means 24, a particular harmonic may be selected for analysis, and the results may be shown on the display means 28 or may activate the control means 30.

Referring to FIGS. 4–5, it can be seen that this invention may be utilized in conjunction with an ultrasonic bonding apparatus 40 including an electromechanical transducer 42 which constitutes the vibration generating means 16 shown in FIG. 1. The transducer 42 may be a conventional type comprising a laminated core 41 of magnetostrictive material, such as nickel, for example. A polarizing coil 44 and an excitation coil 46 are wound through a rectangular slot 43 in the core 41 and around respective opposing sides thereof. The polarizing coil 44 is electrically connected to a direct current source 45, and the excitation coil 46 is electrically connected to an alternating current source 47 which constitutes the oscillatory source 12 shown in FIG. 1. The frequency of the alternating current flowing from the source 47 and passing through the excitation coil 46 generally is in the ultrasonic range, such as sixty kilohertz, for example. The resulting electromagnetic field established by the excitation coil 46 causes the core 41 to elongate and contract in accordance therewith.

Axially attached, by means of a metallurigical joint, to one end of the transducer 42 is an acoustical horn 48 made of an elastic material, such as stainless steel, for example. The horn 48 is supported, in cantilever fashion, by means of a suitable mount 50. Extending downward from the distal end portion of horn 42 is an ultrasonic bonding tool 52 which is made of an elastic material, such as tungsten carbide, for example, and is suitably secured to the horn 48. Positioned below the lower end of the bonding tool 52 is a non-compliant upper surface of an anvil 54 which supports a member 56, such as a wire, for example, in contiguous relationship with another member 58 such as a metal pad on a semiconductor surface 58a.

During operation, the tool 52 is biased downward, as by a spring arrangement (not shown), for example, thereby applying a clamping force on the members 56 and 58, respectively, which holds them in firm contact with one another during the bonding process. The vibrations produced by the transducer 42 travel axially along the horn 48 and, consequently, vibrate the tool 52 transversely in a plane extending axially through the horn 48. The resulting "scrubbing" action of the tool 52 causes material at the interface between members 56 and 58, respectively, to be plastically deformed whereby a metallurgical bond is formed between the memers. Thus, it can be seen that the vibratile transducer 42, horn 48 and tool 52 constitute the vibrating means 14 shown in FIG. 1. Also, the horn 48 and tool 52 constitute the coupling means 18, and the plastically deformable material at the bond interface constitutes the nonlinear load 20.

A vibration sensitive device 60, such as an accelerometer, for example, may be mounted on the bonding tool 52, adjacent the free end thereof, by means of a suitable adhesive, such as epoxy cement, for example. However, the vibration sensing device may be positioned on the vibrating means wherever a useful output may be obtained therefrom, such as on the core 41 of transducer 42, for example. The accelerometer may comprise a piezoelectric crystal sensor made of suitable material, such as lead zirconate titanate, for example, and having a response which is substantially linear over the frequency range of interest. Although other measuring techniques could have been employed, such as capacitance transductance, light reflection and laser interferometry, for examples, the accelerometer method is preferred because it is essentially an inertial technique and, therefore, does not require a signal reference plane. The measurement of tool acceleration is preferable to displacement or velocity measurements, because the high ultrasonic frequencies employed achieve relatively high accelerations as compared to the vibratile velocities and displacements expected.

By means of electrical conductors 62 and 63, respectively, the signal output of the accelerometer 60 is electrically connected to a harmonic analyzing means which may comprise a notch filter circuit 66, an amplifier 68, a bandpass filter network 70, an amplifier 72, an envelope detector 74, an electronic multiplier 76, an electronec integrator 78, which are series connected in the order mentioned. The output of the harmonic analyzing means may be electrically connected to a control means 80, such as a servo control unit for example, and to a display means 84, such as an oscilloscope, for example. Also, the output of the control unit 80 may be connected to the alternating current source 47 for regulating the electrical energy supplied to transducer 42.

The units mentioned as comprising component parts of a typical harmonic analyzing means are of the conventional types readily available on the commercial market. For example, a suitable notch filter 66 may be a Model Series B83 unit made by T T Electronics of Culver City, California. Also, a suitable bandpass filter 70 may be a Series K30A unit made by the same manufacturer. Similarly, a suitable amplifier 68 may comprise a RM4131 operational amplifier unit made by Raytheon Co. of Lexington, Mass.; and a suitable amplifier 72 may comprise a HA–2625 operational amplifier unit made by Harris Semiconductor of Melbourne, Florida. Furthermore, the envelope detector 74 may comprise a LM372 integrated circuit unit made by National Semiconductor of Santa Clara, California; and a suitable multiplier 76 may comprise a Model No. 401 unit made by Intronics of Newton, Massachusetts.

In operation, the mechanical motion of the vibrating tool 52 is converted, by the accelerometer 60, into corresponding electrical signals which are conducted to the harmonic analyzing means 64. When the tool 52 is performing a bonding operation, the output signal from the accelerometer 60 will be a superposition of the excitation frequency and multiple harmonics, as indicated by the oscilloscope trace 90. The notch filter circuit 66 will remove the excitation frequency, thus allowing only the harmonic frequencies to pass through to the bandpass filter network 70, as indicated by the oscilloscope trace 91. The bandpass filter network 70 will allow only a preselected harmonic frequency, such as the third harmonic, for example, to pass on to the envelope detector 74, as indicated by the oscilloscope trace 92. The resulting output of the envelope detector 74 is a waveform depicting the locus of the positive peak amplitude, as indicated by the oscilloscope tracee 93. The envelope waveform is squared in the multiplier 76, as indicated by oscilloscope trace 94; and the resulting waveform is integrated in the intergrator 78, as indicated by the oscilloscope trace 95. The output waveform is conducted to the control unit 80 and to the display unit 84.

By way of illustration, FIG. 6 shows three typical wave-shapes of a third harmonic frequency obtained at the output of the envelope detector 74, while ultrasonically bonding an aluminum wire to a metal film on a semiconductor surface. The upper curve 96 indicates that the wire has been overbonded and, therefore, has been weakened due to excessive plastic deformation. The lower curve 98 indicates that the wire has been underbonded and therefore, the resulting joint is weak due to insufficient plastic deformation. The intermediate curve 97 indicates a good quality ultrasonic bond. By processing these waveforms, as described, and correlating them with both visual and pull test information, evaluations can be made not only of the relative bond strength but also, in most cases, of the cause of a bond being of poor quality, such as surface contamination, for example.

While the present invention has been illustrated herein in conjunction with a system designed to effect an ultrasonic bond between two members, it will be appreciated by those skilled in the art that the present invention may be applied to other devices wherein it is desirable to determine the operative effectiveness of the device, when performing work on a nonlinear load, such as in ultrasonic drilling, soldering, cleaning, homogenizing and the like.

From the foregoing, it will be apparent that all of the objectives of this invention have been achieved by the structures shown and described. It will also be apparent, however, that various changes may be made by those skilled in the art without departing from the spirit of the invention as expressed in the appended claims. It is to be understood, therefore, that all matter shown and described is to be interpreted as illustrative and not in a limiting sense.

We claim:

1. In combination:
    a source of oscillatory electrical energy;
    an electromechanical transducer having a portion electrically connected to said source and a vibratile portion responsive to the oscillations of said energy, the vibratile portion having an excitation frequency of vibration;
    mechanical coupling means attached to said vibratile portion for conducting vibrational motion thereof to a non-linear load;
    vibration sensing means disposed in responsive relationship to the vibrational motion of the coupling means and having an electrical output corresponding to the vibrational modes of said coupling means;
    harmonic analyzing means electrically connected to the output of the vibration sensing means and having an electrical output corresponding to a harmonic vibrational mode of the coupling means; and
    indicator means electrically connected to the output of the harmonic analyzing means.

2. The combination as set forth in claim 1 wherein the vibratile portion of the transducer comprises an elongated body of magnetostrictive material and the electrically connected portion of the transducer comprises an excitation coil encircling a portion of said body.

3. The combination as set forth in claim 1 wherein the vibratile portion has an excitation frequency of vibration within the ultrasonic range.

4. The combination as set forth in claim 3 wherein the coupling means comprises an acoustical horn having one end attached to the vibratile portion of the transducer and a bonding tool attached to an opposing end portion thereof.

5. The combination as set forth in claim 4 wherein the vibration sensing means comprises an accelerometer secured to the bonding tool.

6. The combination as set forth in claim 1 wherein the harmonic analyzing means includes a notch filter circuit and a bandpass filter network connected in electrical series with the output of the vibration sensing means.

7. The combination as set forth in claim 6 wherein the harmonic analyzing means includes an envelope detector network, an electronic multiplier circuit and an electronic integrator device connected in electrical series with the bandpass filter network.

* * * * *